United States Patent
Chari

[19]

[11] Patent Number: 6,038,319
[45] Date of Patent: Mar. 14, 2000

[54] SECURITY MODEL FOR SHARING IN INTERACTIVE TELEVISION APPLICATIONS

[75] Inventor: Suresh N. Chari, Elmsford, N.Y.

[73] Assignee: OpenTV, Inc., Mountain View, Calif.

[21] Appl. No.: 09/087,386

[22] Filed: May 29, 1998

[51] Int. Cl.[7] ........................................................ H04L 9/32
[52] U.S. Cl. ........................... 380/33; 713/175; 713/156
[58] Field of Search ............................. 380/5, 7, 10, 23; 348/3

[56] References Cited

U.S. PATENT DOCUMENTS

| | | |
|---|---|---|
| 4,995,080 | 2/1991 | Bestler et al. . |
| 5,046,090 | 9/1991 | Walker et al. ............................... 380/5 |
| 5,586,260 | 12/1996 | Hu . |
| 5,625,693 | 4/1997 | Rohatgi et al. . |
| 5,920,626 | 12/1999 | Durden et al. ............................. 380/10 |

FOREIGN PATENT DOCUMENTS

| | | |
|---|---|---|
| 97/24832 | 7/1997 | WIPO . |
| 98/00972 | 1/1998 | WIPO . |

OTHER PUBLICATIONS

International Search Report for Application No. PCT/US99/11537 mailed Aug. 24, 1999.

*Primary Examiner*—Tod R Swann
*Assistant Examiner*—Todd Jack
*Attorney, Agent, or Firm*—Conley, Rose & Tayon, P.C.; Mark L. Berrier

[57] ABSTRACT

A system and method implemented in an interactive television system for restricting access between modules of different interactive television applications and carousels. The system broadcasts modules from a broadcast station to a plurality of receiving stations, which execute applications containing the modules. The applications utilize a credential consisting of a producer identification number (ID) and an application ID for each of the grantor and grantee applications/carousels, an expiration date, a producer certificate and a signature. A application requesting access (grantee) and a carousel granting access (grantor) are each identified by respective producer and application IDs. The credential utilizes public key encryption for ensure the integrity of the credential. The producer and application IDs of the grantee application and the application ID of the grantor carousel may be replaced with wildcards so that access to a single carousel's modules is granted to a group of producers or applications, or access to a group of carousels is granted to a single producer or application.

23 Claims, 4 Drawing Sheets

SECURITY MODEL FOR SHARING IN INTERACTIVE TELEVISION APPLICATIONS

BACKGROUND OF THE INVENTION

1. Field of the Invention

The invention relates to interactive television systems and more particularly to means for ensuring security in accesses between modules of different carousels.

2. Description of the Related Art

Interactive television systems enable television sets to be used to provide various new means for providing services to viewers. Interactive television systems are capable of displaying text and graphic images in addition to typical video program streams. Interactive television systems are also capable of registering viewer actions or responses. Proposed features of interactive television include a variety of marketing, entertainment and educational capabilities such as allowing a user to interact with televised programs by ordering advertised products or services, competing against contestants in a game show, or requesting specialized information regarding particular programs.

Typically, a broadcast service provider generates an interactive television signal for transmission to a viewer's television. The interactive television signal includes an interactive portion consisting of application code or control information, as well as an audio-video portion consisting of a television program. The broadcast service provider combines the audio-video and interactive portions into a single signal for transmission to a receiver connected to the user's television. The signal is generally compressed prior to transmission and transmitted through typical broadcast channels, such as cable television (CATV) lines or direct satellite transmission systems.

The interactive functionality of the television is controlled by a set-top box connected to the television. The set-top box receives the signal transmitted by the broadcast service provider, separates the interactive portion from the audio-video portion and decompresses the respective portions of the signal. The set-top box uses the interactive information to, for example, execute an application while the audio-video information is transmitted to the television. The set-top box may combine the audio-video information with interactive graphics or audio generated by the interactive application prior to transmitting the information to the television. The interactive graphics and audio may present additional information to the viewer or may prompt the viewer for input. The set-top box may provide viewer input or other information to the broadcast service provider via a modem connection.

Interactive television applications may consist of a set of program modules. The set of modules forming an application is typically self-contained in that all of the code needed by the application is in the set of modules. The first module is a directory module which identifies all of the modules which are part of the application. The entire set of modules, which is listed in the directory module, is transmitted via the broadcast channel to the set-top box and the application is executed. If a first interactive television application has completed execution and a second is to be executed, the directory and other modules of the second application are transmitted to the set-top box and the second application is executed. The entire set of modules used by the second application are transmitted even though some of the modules might be identical to modules used by the first application.

It may be advantageous to design software applications in a modular fashion so that modules may be shared between applications. The advantages of modularity may include conserving the limited amount of memory in a set-top box which can be used for interactive applications, reducing the time required to download applications from a broadcast station to a set-top box or reducing the amount of application code which must be written by allowing modules to be shared. Because the components of an application may reside in different carousels, it would be desirable to ensure the security of the respective modules and accordingly restrict access to authorized modules. Further, it would be desirable to implement a security system which minimizes the overhead associated with the interactive television system.

SUMMARY OF THE INVENTION

The invention comprises a system and method for restricting or controlling access between modules of different interactive television applications. One embodiment of the invention provides means in an interactive television system to verify the credentials of certain applications which request access to other applications' modules. The system is implemented in order to ensure the security, safety and authority of the respective applications with respect to the access. The system utilizes a credential consisting of a producer identification number (ID) and an application ID for each of the grantor and grantee applications, an expiration date, a producer certificate and a signature. The producer and application IDs uniquely identify the respective applications. The credential utilizes public key encryption (described in more detail below) for security and the producer certificate is the producer's public key. The entire credential is signed with the producer's private key so that the integrity of the credential can be verified.

A grantor application may grant access to a specific grantee application using the credential. The owner of the grantor application has an ID which is used as the grantor application's producer ID in the credential. Likewise, the owner of the grantee application has an ID which is used as the grantee application's producer ID in the credential. The owners of both the grantor and grantee applications have assigned to the applications specific IDs which are used as the grantor application ID and grantee application ID, respectively. Each producer, including the grantor and grantee, assigns to each of its applications an ID which is unique among its applications. Any given application can therefore be identified by its producer and application IDs. Thus, any given application can grant access to a specific application owned by a specific owner. The producer and application IDs of the grantee application and the application ID of the grantor application may be replaced with wildcards so that access to a single application's modules is granted to a group of owners or applications, or access to a group of applications is granted to a single owner or application.

BRIEF DESCRIPTION OF THE DRAWINGS

Other objects and advantages of the invention will become apparent upon reading the following detailed description and upon reference to the accompanying drawings in which.

Figure 1:
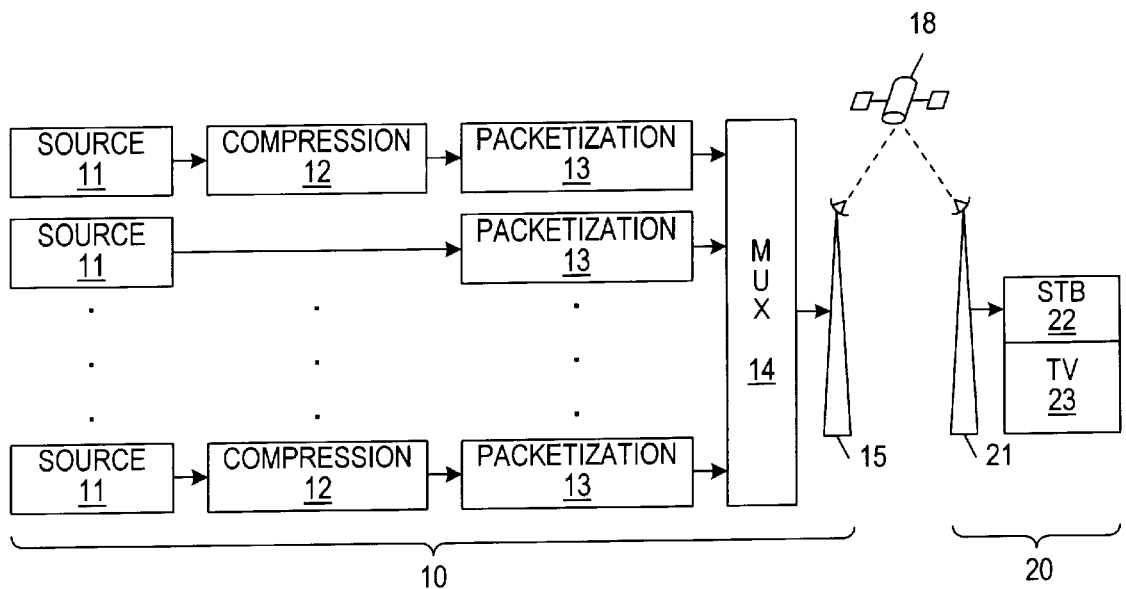
FIG. 1 is a block diagram illustrating the distribution of interactive television applications and television programs from their sources to a series of viewers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

One embodiment of the invention is described below. In this embodiment, an interactive television receiver accepts an audio-video-interactive signal via a broadcast channel such as direct satellite transmission. ("Direct" satellite transmission as used herein contemplates transmissions received by the interactive television receiver, more particularly by its antenna, directly from the satellite.) The audio-video-interactive signal contains television programs or similar audio-video content, as well as interactive content such as control signals or interactive applications. ("Broadcast" is used herein to refer to transmission of a single signal to all subscribing receivers.) The interactive television receiver is also configured to receive audio-video-interactive signals via a non-broadcast channel such as a modem. The interactive television receiver is configured to separate the audio-video content from the interactive content of the audio-video-interactive signal. The audio-video content is processed for display as a television program, while the interactive content is processed for execution by the receiver. The interactive content may enable the receiver to perform a variety of functions, including generating audio or graphics which are combined with the television program for display. If the interactive content comprises an application, the application may consist of several subcomponents, or modules. The modules can contain any type of data, such as application code, raw data or graphical information.

The modules which form the interactive application usually belong to a single set of modules referred to as a carousel. A carousel can generally be defined as a set of modules which are owned by the same producer and have the right to access each other. The modules are referred to as a carousel because they are typically transmitted to the interactive television receiver in a cyclic manner. An application is a carousel which contains a "top-level" program. It may, however, be desirable to allow the application to access modules of another carousel (for sharing of data or other purposes). An application or module of one carousel can gain secure access to modules of another carousel by employing "credentials." The credentials are sets of data which can be used to identify the carousels which grant, and which are granted, access and thereby verify that the accessor (grantee) module is authorized to access the other (grantor) modules. The credentials may utilize wildcards to grant access authorization to a number of grantor or grantee modules without having to maintain a list of all the involved modules.

Referring to FIG. 1, a block diagram illustrating the distribution of interactive television applications and television programs from their sources to a series of viewers is shown. Broadcast station 10 has several program sources 11. These sources may include remote broadcast network feeds, videotape recorders, computers, data storage devices, and the like. Sources 11 may provide interactive or control information, audio information and/or video information which is to be included in the interactive television signal. The information provided by sources 11 is typically compressed by compression units 12 in order to conserve bandwidth. Any of a number of compression algorithms, such as one of the Motion Picture Expert Group (MPEG) compression standards, may be used. The choice of an appropriate compression algorithm will depend on the type of information to be compressed and the transmission medium, among other things. Time stamps may also be added to, for example, synchronize associated audio and video signals. Some information may not be easily or effectively compressed, so some of the information may be routed directly from the source to packetization unit 13 without compressing the information. Packetization units 13 accept the compressed (or uncompressed) information and format it into packets for transmission over the broadcast channel. The packetization of the information will be described in more detail below. The packets are fed into multiplexing unit 14, which intersperses the packets prior to transmission. The interspersed packets are then broadcast to the receiving stations 20. (Although only one receiving station is shown in the figure, it is contemplated that the audio-video-interactive signal is broadcast to a group of subscribing receiving stations.) In the figure, the audio-video-interactive signal is depicted as being transmitted via satellite broadcast through antenna 15.

The broadcast signal is relayed by communications satellite 18 and received by receiving station 20. Although the figure illustrates a satellite transmission, it is contemplated that any broadcast medium (e.g., CATV or direct satellite transmission) may be used. Receiving station 20 is contemplated to be one of a number of such stations which are subscribers of the broadcast service provider operating broadcast station 10. The broadcast signal is collected by receiving antenna 21 and fed to receiver 22, which in this embodiment is contemplated to be a set-top box. Set-top box 22 processes the packetized signal to reconstruct the television programs and interactive applications embodied in the signal. The reconstructed applications are executed in the set-top box, while the reconstructed television programs are passed to the television, where they are displayed. The interactive applications may generate graphics or audio which are combined with the television program prior to being displayed.

In addition to the broadcast channel between the broadcast station and receiving station, there may be other channels, such as a modem channel (which may also be referred to as an http, or hypertext transfer protocol, channel.) These types of channels serve two functions in the system: they allow the set-top box to provide feedback to the broadcast station; and they provide an alternate path for programs and applications from sources 12 to be delivered to receiving station 20.

Figure 2:
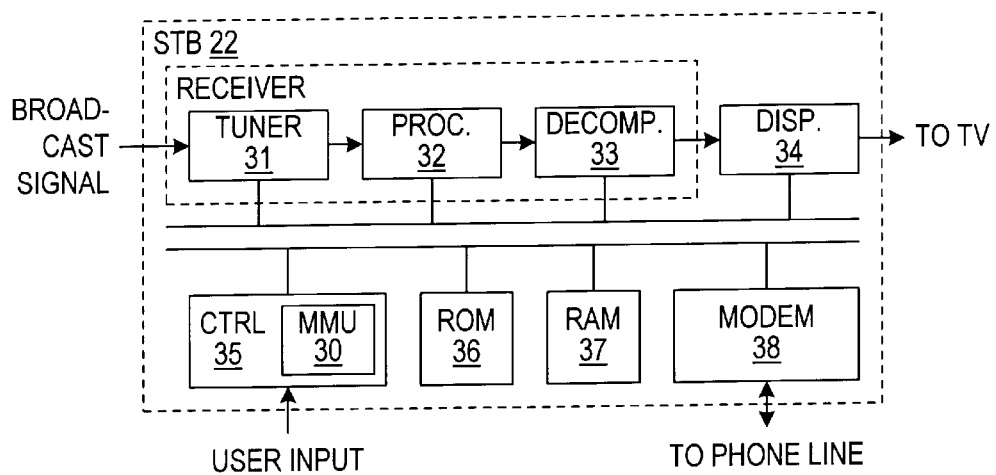
FIG. 2 is a block diagram of a set-top box used in one embodiment of the invention.

Referring to FIG. 2, a block diagram of a set-top box 22 is shown. The broadcast signal is received and fed into tuner 31. Tuner 31 selects the channel on which the broadcast audio-video-interactive signal is transmitted and passes the signal to processing unit 32. (Tuner 31 may be replaced by other means, all collectively referred to herein as input ports, for receiving signals from various signal sources.) Processing unit 32 demultiplexes the packets from the broadcast signal if necessary and reconstructs the television programs and/or interactive applications embodied in the signal. The programs and applications are then decompressed by decompression unit 33. The audio and video information associated with the television programs embodied in the signal is then conveyed to display unit 34, which may perform further processing and conversion of the information into a suitable television format, such as NTSC or HDTV audio/video. Applications reconstructed from the broadcast signal are routed to random access memory (RAM) 37 and are executed by control system 35.

Control system 35 may include a microprocessor, microcontroller, digital signal processor (DSP), or some other type of software instruction processing device. RAM 37 may include memory units which are static (e.g., SRAM), dynamic (e.g., DRAM), volatile or non-volatile (e.g., FLASH), as required to support the functions of the set-top box. When power is applied to the set-top box, control system 35 executes operating system code which is stored in ROM 36. The operating system code executes continuously while the set-top box is powered in the same manner the operating system code of a typical personal computer (PC) and enables the set-top box to act on control information and execute interactive and other applications. The set-top box also includes modem 38. Modem 38 provides both a return path by which viewer data can be transmitted to the broadcast station and an alternate path by which the broadcast station can transmit data to the set-top box.

Although the term "set-top box" is used herein, it is understood that this term refers to any receiver or processing unit for receiving and processing a transmitted signal and conveying the processed signal to a television or other monitor. The set-top box may be in a housing which physically sits on top of a television, it may be in some other location external to the television (e.g., on the side or back of the television or remotely located from the television), or it may be incorporated into the television itself. Set-top box 22 serves to demodulate the signal received from broadcast station 10 and to separate the components of the signal, such as different television programs and interactive applications. Similarly, television 23 may be a television or a video monitor employing any suitable television format (e.g., NTSC or HDTV), or it may be replaced by other devices, such as a video recorder.

The receiving station is operatively connected to the broadcast station by a broadcast channel. This broadcast channel could utilize various transmission media and is contemplated to include media such as coaxial cable and free space (e.g., as used for direct satellite transmissions.) The broadcast channel forms a transmission path between the broadcast station and the receiving station. The broadcast station and receiving station are also connected by a return path. The return path typically consists of a pair of modems, one in the receiving station and one in the broadcast station, each connected to a standard telephone line. Other means for establishing a return path, e.g., using a portion of the bandwidth of the transmission path, are also contemplated.

Figure 3:
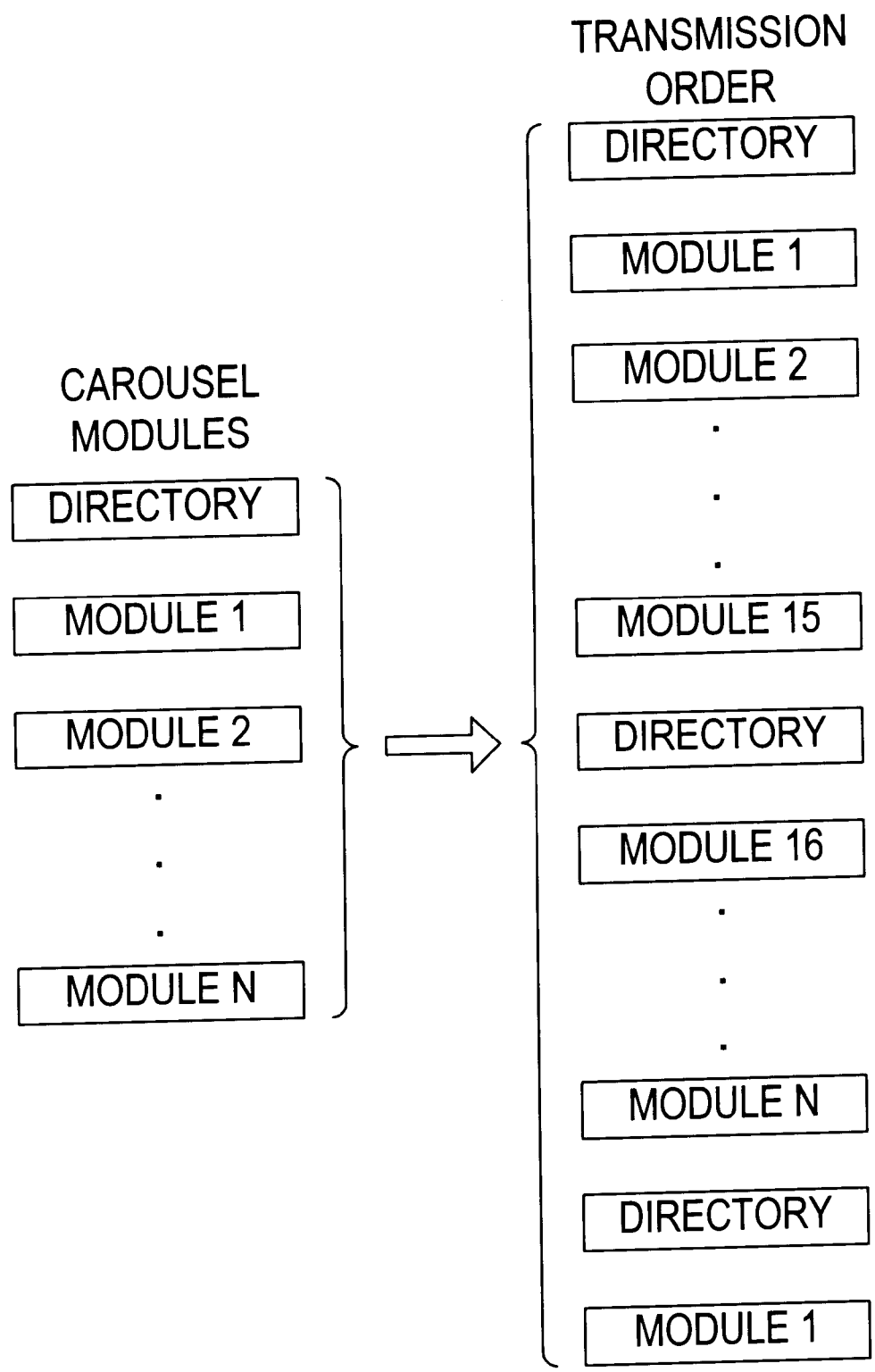
FIG. 3 is an illustration of the component modules of a carousel and the transmission order of the modules in one embodiment of the invention.

Referring to FIG. 3, an application (and in fact any carousel) consists of a series of modules, one of which is a directory module. The directory module has a unique identifier so that it can be identified during transmission without further information. The directory module contains an entry for each of the modules in the application and any module which does not have a corresponding entry in the directory module is not recognized by the application. The directory module contains enough information to allow the interactive television receiver to access all of the parts (i.e., modules) of the application which may be necessary for execution of the program. The directory module must be accessed before the other modules of the application so that the remainder of the modules can be properly interpreted. The directory module may be transmitted several times during the cycle in which the modules of the application are transmitted in order to ensure that it is available for essentially random access to the other modules.

The directory modules of all the applications have a common format. The format consists of three parts: a portion having fixed-length components; a portion having variable-length components; and a portion having certification information. The fixed-length portion contains data on the application and each of the modules in the application. The variable-length portion contains string data on the module names and the hash of the modules. The certification portion contains the producer certificate and directory signature.

In one embodiment, an application includes at least one module which is downloaded and executed automatically. Other modules containing data or additional code may not be needed immediately, so they may be downloaded after execution of the application begins. The downloading of these modules may be subject to timing constraints, however, so the interactive television system is configured to take these constraints into account and deliver the modules in a timely manner. If necessary, one of these modules may be multiplexed with other modules or data to be sure it is received when needed.

Figure 4:
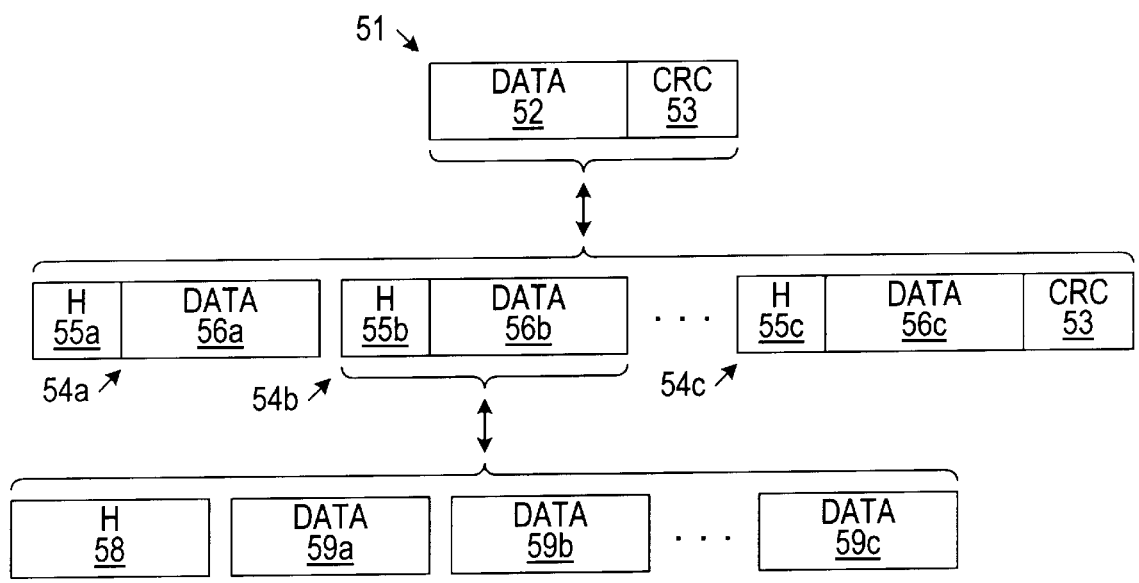
FIG. 4 is a block diagram illustrating the manner in which the data comprising a module is packetized in one embodiment of the invention.

Referring to FIG. 4, each of the modules 51 has a data segment 52 and a CRC segment 53. The data segment 52 of the directory module is described above. The data segment 52 of the remainder of the modules can contain any type of data, such as application code or raw data. The CRC segment 53 of each of the modules is used for error control and is computed for the entire module 51. Each of the modules 51 has a unique identifier.

Before the modules 51 are transmitted, they are formatted into transmission units 54. For the purposes of discussion, items referenced by the same number but different letters (e.g., 54a, 54b, 54c) will be collectively referred to by the number only (e.g., 54). Each of the transmission units 54 contains header information 55, which uniquely identifies that transmission unit 54 within the stream of transmission units, and data 56 which comprises a portion of the module being transmitted. The header 55 contains information such as the module ID, module offset and size, which allow the transmission units 54 to be reconstructed into a complete module 51. The transmission units 54 comprising a particular module 51 may be interleaved with other transmission units 54 in the transmission stream. The last transmission unit 54 for a module 51 carries the CRC 53.

The format of the transmission units 54 is dependent upon the transmission medium, but typically employs a series of packets of fixed length (the last packet may be padded to obtain the proper length.) The first packet 58 in the series carries the header information for the transmission unit 54. This header packet 58 is a special packet which can generate an interrupt in the CPU and which contains information to enable the CPU to determine whether the module 51 should be decoded and where it should be loaded into memory. The header packet 58 in a direct satellite transmission utilizes an auxiliary type packet which can generate an interrupt. The remainder of the packets 58 in a direct satellite transmission utilize a basic type packet which simply carries the transmission unit data.

The audio-video-interactive transmission from the broadcast station to the interactive television receiver comprises a series of transmission units. The transmission units which form a given module are typically time multiplexed with other information. This information may consist of transmission units of another module or compressed audio or video. The transmission units which are received by the interactive television receiver are reconstructed into their respective application modules.

Figure 5:
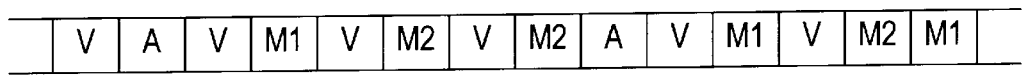
FIG. 5 is a diagrammatic representation of the signal transmitted from the broadcast station to a receiving station in one embodiment of the invention.

Referring to FIG. 5, a diagrammatic representation of the signal transmitted from broadcast station 10 to receiving station 20 is shown. The packets of several program sources are multiplexed into a single transmission stream if necessary. These packets may contain data for various applications or television programs. The illustrated transmission stream includes audio (A) and video (V) packets of a television program, as well as packets of two interactive application modules (M1, M2.) The packets are formatted as explained above to enable reconstruction of the packets into the respective programs and modules. It should be noted that several modules can be simultaneously transmitted by combining their packets in the transmission signal. The figure illustrates the time multiplexing of the packets of the modules and the television program. The modules need not belong to the same carousel to be transmitted together. It can be seen from the figure that there are typically more packets of video data for a particular television program than audio data for that program as a result of the greater amount of video data which typically must be transmitted.

The broadcast signal is received by set-top box 22. Set-top box 22 may also have a modem connection for receiving an http signal. Set-top box 22 is contemplated to include a module management unit which is configured to detect packets corresponding to modules which are required for execution of an interactive television application. The modules are not necessarily required to begin execution of the respective application, but may be requested by the application after it begins execution.

Set-top box 22 demultiplexes the packets, separating the packets containing data on the modules from packets containing audio and video for television programs. The module management unit detects module packets and determines whether these packets correspond to modules needed by the executing application. The set-top box then reconstructs the modules from the corresponding packets and reconstructs the television programs from the packets containing the associated audio and video data. As explained above, the modules are stored in RAM 37, where they are available for use by applications executing in the control system 35.

The modules within a given carousel are generally created by a single producer who intends the modules to have access to each other. There is therefore typically no need for a security mechanism to restrict access between these modules. As pointed out above, however, applications may be designed to utilize modules which belong to more than one carousel. It is therefore desirable to implement a security device which controls, for purposes such as application safety and licensing, whether modules of one carousel are allowed to access modules of another carousel.

One module may gain access to a module in a different carousel by means of a credential. A credential is a collection of information which typically identifies the carousels of the first and second modules and can be taken as proof of the first module's authorization to access the second module. The first module's carousel is the grantee (it has presumably been granted the right to access the other) and the second module's carousel is the grantor (it has presumably granted authorization to the first module.)

The grantor's producer creates the credential and distributes the credential to other producers who he or she desires to have access to the grantor carousel. The credential can be created by secure means and it can be determined whether the credential was produced by the producer of the grantor carousel. The producers to whom the credential is distributed can incorporate the credential into their own modules or carousels which may need access to modules of the grantor carousel. The credential is presented by the grantee module to the interactive television system to verify that it is allowed to access the grantor carousel, and the system allows access upon verification of the credential. The interactive television system verifies the credential by comparing the producer and application IDs specified in the credential for the grantor and grantee carousels to the corresponding IDs of the requesting and requested modules. The system also verifies that the credential has not expired, as determined by an expiration date in the credential. It is contemplated that verification of the credentials may be performed either prior or subsequent to execution of the application which will request access to other carousels.

Before the credential structure is described, it should be noted that there are a variety of security systems which use "public key" encryption. Public key encryption systems may employ various encryption algorithms. One embodiment uses RSA (Rivest, Shamir & Adleman) and DES (Data Encryption Standard) algorithms. Public key encryption utilizes a pair of encryption keys, one of which is termed a private key and one of which is called a public key. The private key is kept secret by its owner, while the public key is made freely available. A message or other file which is encrypted with the public key can only be decrypted with the private key. Likewise, a file which is encrypted with the private key can only be decrypted with the public key. When a message is encrypted with one of the keys, it is converted into an apparently random set of characters. Thus, when a message encrypted with a public key is sent to the holder of the private key, the sender can be assured that, even if the message is intercepted, only the intended recipient (who holds the private key) can decrypt it and read the message. When a message is signed, rather than encrypted, the message remains in readable form, but an encrypted signature is appended to the message. While anyone who sees the message can read it, the signature can be used to verify that the message originated with the holder of the private key. Further, because the algorithm which encrypts the signature is dependent in part upon the message which precedes the signature, any changes to the message will cause the signature to be unverifiable. The signature can therefore be used to ensure that the message is unaltered.

Figure 6A:
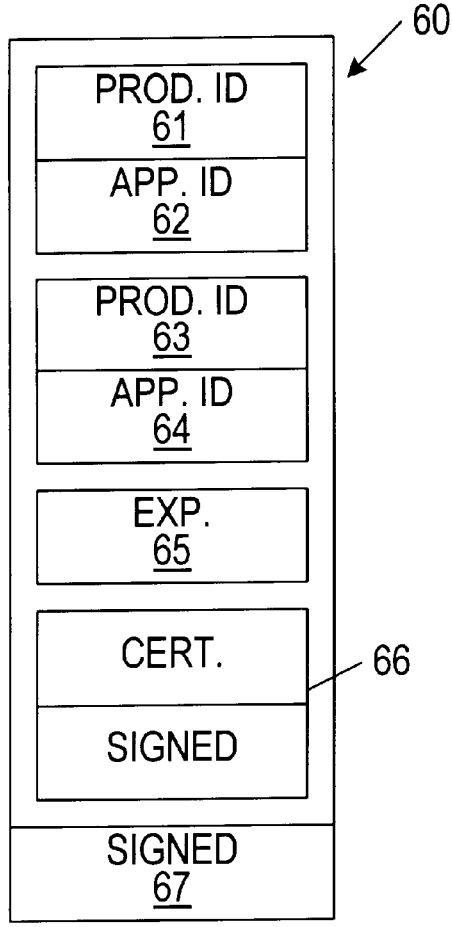
FIG. 6 is a block diagram illustrating the data structure of a credential used in one embodiment of the invention.

Referring to FIG. 6a, a diagram illustrating a simple credential data structure 60 is shown. Credential 60 includes grantor information, grantee information, an expiration date and a producer certificate. The credential is signed to enable verification of the credential. The grantor information includes the producer ID 61 and the carousel ID 62 for the grantor carousel. Likewise, the grantee information includes the producer ID 63 and the carousel ID 64 for the grantee carousel. Expiration date 65 can be included in the credential to limit the period for which the credential is valid. The credential also contains a producer certificate 66 which is the producer's public key, signed by some trusted party. (A trusted party is one who can vouch for the authenticity of the key. The trusted party's signature is encrypted and incorporated into the key.) The trusted party's key is well known.

That is, it is stored in the system and is always available to the system. The producer certificate 66 is used to guarantee that the credential was created by the producer. The entire credential 60 is then signed 67 with the producer's private key to ensure that none of the data in the credential 60 can be modified. A similar type of credential may be used by the broadcast service provider to allow receiving stations to authenticate modules delivered by the broadcast service provider.

It is apparent that the use of a single credential for each instance of an application requiring access to a carousel can result in a very large number of credentials which may need to be maintained by a grantee carousel. If a carousel may require access to many other carousels of other producers, one credential would be required for each of these carousels. Creating and maintaining such a large number of credentials may also create a need for a great deal of coordination between producers. The credentialing system can therefore create substantial overhead which may outweigh the security benefits which it provides.

Figure 6B:
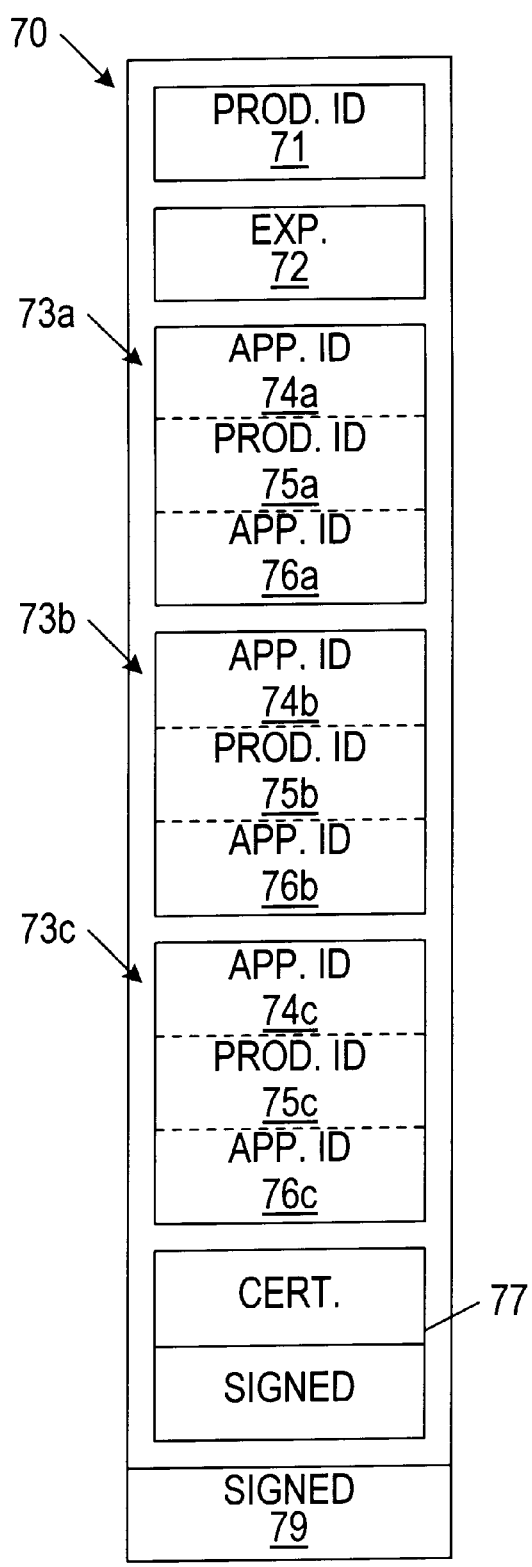

In one embodiment, this problem is addressed by allowing a credential to list a number of grantee applications (by producer ID and application ID) and one or more grantor applications. For example, as shown in FIG. 6b, a credential may include a single grantor producer ID 71 and an expiration date 72. The credential may then list several series of IDs 73a–73c, each series having a grantor application ID 74, a grantee producer ID 75 and a grantee application ID 76. Each of the series of information thus identifies one grantor application/carousel owned by the grantor producer and one application which is authorized to access the identified grantor application. The grantee application is, as described above, identified by a grantee producer ID 75 and a grantee application ID 76. The credential contains a signed producer certificate 77 and the whole credential is signed 78 in the same manner as the previously described credential.

One embodiment employs wildcards to further reduce the potential number of credentials which must be maintained for a given carousel. The grantee's producer or application IDs or the grantor carousel's application ID may be replaced with wildcards. The wildcards are specific IDs which have been predefined as wildcards. For example, an ID having all zeros or all ones may be defined to be a wildcard. When a credential is presented to the system for verification, a wildcard is considered to identically match all IDs with which it is compared. The grantor's producer ID cannot be a wildcard because the system must be able to verify that the grantor was actually the producer of the credential. If the grantor application ID is a wildcard, then the specified grantee can access all of the grantor producer's carousels. If the grantee application ID is a wildcard, any carousel of the specified grantee (producer) can access the specified grantor carousel(s). If both the grantee producer ID and the grantee application ID are wildcards, any carousel can access the specified grantor carousel. Wildcards can be used with either of the credentials described above (i.e. the single grantor, single grantee credential or the multiple grantor/grantee credential.)

While the embodiment described above utilizes credentials at the level of the carousel, it is contemplated that alternate embodiments may implement credentials or other security measures at the module level. Alternative security measures may include encrypting the modules, performing a hash function over the modules and including the hash value in the corresponding directory module or the like. Credentialing or other security in the directory module would typically be implemented after the insertion of, for example, the other modules' hash values in the directory module.

It is contemplated that encryption systems similar to those described above for accesses between modules may also be employed for purposes of verifying the authenticity of carousels or modules received by a set-top box. A carousel (or more particularly its directory module) may contain a certificate encrypted with the private key of the producer. The set-top box, having a copy of the producer's public key, can verify that the carousel came from the producer by decrypting the certificate using the public key. The use of hash functions as described above may also be employed to ensure the authenticity of the non-directory modules.

The details of the particular embodiments described above may be modified without departing from the spirit and scope of the invention as defined by the appended claims. The embodiments described above are accordingly intended to be exemplary rather than limiting. It is contemplated that various modifications and alternative embodiments will be apparent to those skilled in the art of the invention.

What is claimed is:

1. A method for restricting access to carousel modules in an interactive television system, the method comprising:

loading a first carousel having a credential associated therewith, said credential including ID information identifying one or more grantee applications and one or more grantor applications;

determining whether said credential is valid;

storing said ID information if said credential is valid;

requesting access from an application associated with said first carousel to a module of a second carousel;

granting access to said second carousel if said ID information identifies said first carousel as one of said one or more grantee applications and identifies said second carousel as one of said one or more grantor applications.

2. The method of claim 1 wherein said credential contains an expiration date and wherein said step of determining whether said credential is valid further comprises determining whether said expiration date has passed.

3. The method of claim 1 wherein said information identifying said grantee carousel comprises a grantee producer ID and a grantee carousel ID and wherein said information identifying said grantor carousel comprises a grantor producer ID and a grantor carousel ID.

4. The method of claim 3 wherein one or more of said grantee producer ID, said grantee carousel ID and said grantor carousel ID is a wildcard.

5. The method of claim 1 wherein at least a portion of said credential is encrypted to ensure that the credential is valid.

6. The method of claim 5 wherein said credential includes a producer's certificate, said producer's certificate comprising a public encryption key, said public encryption key being signed by a trusted party, and wherein said credential is signed with a private encryption key.

7. The method of claim 1 wherein said step of transmitting comprises combining said modules of said first carousel, said modules of said second carousel and a television program into a single signal and broadcasting said signal to said interactive television receiver.

8. The method of claim 7 wherein said step of combining comprises formatting each of said modules of said first carousel, said modules of said second carousel and said television program into packets and multiplexing said packets together in said single signal.

9. The method of claim 8 wherein said step of broadcasting comprises broadcasting said single signal over a direct satellite broadcast channel.

10. A device in an interactive television system for controlling access requested by a first module of a first carousel to a second module of a second carousel, comprising:
- a receiver configured to receive an broadcast interactive television signal containing said first and second carousel modules, said first carousel module containing a credential for accessing said second carousel module;
- a data storage device for storing said plurality of carousel modules;
- a microprocessor configured to verify said credential, said microprocessor being further configured to allow said first carousel module to access said second carousel module if said credential is valid and to prevent said first carousel module from accessing said second carousel module if said credential is not valid.

11. The device of claim 10 wherein said first and second carousel modules contained in said broadcast interactive television signal are packetized and compressed and wherein said receiving unit is configured to reconstruct and decompress said first and second carousel modules.

12. The device of claim 10 wherein said broadcast interactive television signal contains audio and video information associated with a television program.

13. The device of claim 12 wherein said audio and video information and said first and second carousel modules contained in said broadcast interactive television signal are packetized and compressed and wherein said receiving unit is configured to reconstruct and decompress said audio and video information and said first and second carousel modules.

14. The device of claim 12 wherein said credential includes one or more wildcards.

15. The device of claim 10 wherein said broadcast interactive television signal comprises a direct satellite transmission.

16. The device of claim 10 wherein said credential comprises a grantor's producer ID, a grantor's application ID, a grantee's producer ID and a grantee's application ID, wherein said first carousel module has a first producer ID and a first application ID, wherein said second carousel module has a second producer ID and a second application ID, and wherein said microprocessor is configured to verify said credential by comparing said grantee's producer ID to said first producer ID, said grantee's application ID to said first application ID, said grantor's producer ID to said second producer ID and said grantor's application ID to said second application ID.

17. The device of claim 16 wherein said microprocessor is configured to determine that said credential is valid if each of said comparisons are identities and invalid otherwise.

18. The device of claim 16 wherein one or more of said grantee's producer ID, said grantee's application ID and said grantor's application ID are wildcards, wherein said microprocessor is configured to treat said wildcards as identical to any value, and wherein said microprocessor is configured to determine that said credential is valid if each of said comparisons are identities and invalid otherwise.

19. The device of claim 16 wherein said credential further comprises a producer's public encryption key, said key being signed by a trusted party.

20. The device of claim 16 wherein said credential is signed with a producer's private encryption key.

21. An interactive television system configured to control access between carousel modules, the system comprising:
- a broadcast station configured to transmit a broadcast signal containing a plurality of carousel modules, said plurality of carousel modules including one or more modules of a first carousel and one or more modules of a second carousel;
- a receiver configured to receive said broadcast signal from said broadcast station, to extract said plurality of carousel modules from said broadcast signal and to execute an application comprising said modules of said first carousel, said receiver being further configured to accept a request from said application to access a module of said second carousel and to allow said application to access said module of said second carousel if said application has a valid credential.

22. The interactive television system of claim 21 wherein said broadcast station is configured to format said modules of said first and second carousels and a television program into packets and to time multiplex said packets into said broadcast signal.

23. The interactive television system of claim 22 wherein said credential comprises information identifying a grantor and a grantee, said information comprising one or more wildcards, and wherein said broadcast receiver is configured to determine whether said credential is valid by comparing said grantor information with corresponding information of said module of said second carousel and by comparing said grantee information with corresponding information of said application.

* * * * *